(12) United States Patent
Murayama et al.

(10) Patent No.: US 7,748,727 B2
(45) Date of Patent: Jul. 6, 2010

(54) SUSPENSION STRUCTURE (75) Inventors: Yuuki Murayama, Zama (JP); Takahiro Watanabe, Hiratsuka (JP); Yoshihiro Konno, Machida (JP); Hajime Katou, Hadano (JP); Hiroyuki Yuasa, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 446 days.

(21) Appl. No.: 11/761,435

(22) Filed: Jun. 12, 2007

(65) Prior Publication Data
US 2007/0284840 A1 Dec. 13, 2007

(30) Foreign Application Priority Data
Jun. 13, 2006 (JP) .............................. 2006-163803
Jun. 13, 2006 (JP) .............................. 2006-163804

(51) Int. Cl.
*B60G 3/18* (2006.01)
(52) U.S. Cl. ..................... 280/124.135; 280/124.137; 280/124.149; 280/124.152
(58) Field of Classification Search .......... 280/124.137, 280/124.145, 124.149, 124.152
See application file for complete search history.

(56) References Cited

U.S. PATENT DOCUMENTS

| 4,501,436 | A  | * | 2/1985  | Ishida ................. 280/124.108 |
| 4,798,397 | A  | * | 1/1989  | Komiya ............... 280/124.152 |
| 5,249,817 | A  | * | 10/1993 | Bruhl .................. 280/124.137 |
| 6,305,701 | B1 | * | 10/2001 | Bobinger et al. ...... 280/124.145 |
| 6,412,797 | B1 | * | 7/2002  | Park .................... 280/124.125 |
| 7,219,909 | B2 | * | 5/2007  | Furutani et al. ....... 280/124.155 |
| 7,325,820 | B2 | * | 2/2008  | Allen et al. ............ 280/124.15 |
| 7,384,053 | B1 | * | 6/2008  | Boecker et al. ....... 280/124.152 |
| 2006/0290088 | A1 | * | 12/2006 | Luttinen et al. .......... 280/93.51 |

FOREIGN PATENT DOCUMENTS

| EP | 0 830 955 A1 | 3/1998 |
| FR | 2 707 926 A1 | 1/1995 |
| JP | 04 238715 | 8/1992 |
| JP | 2000-153705 | 6/2000 |

* cited by examiner

Primary Examiner—Toan C To
(74) Attorney, Agent, or Firm—Young Basile (57) ABSTRACT

A suspension structure is provided having a shock absorber for dampening the vibration from a wheel and a stabilizer for suppressing the up and down strokes in opposite phases generated from opposing wheels on a vehicle. The end portion of the stabilizer is connected to the lower end portion of the shock absorber.

18 Claims, 8 Drawing Sheets

← INNER SIDE WITH RESPECT TO THE VEHICLE WIDTH DIRECTION

OUTER SIDE WITH RESPECT TO THE VEHICLE LATERAL DIRECTION

REAR SIDE WITH RESPECT TO THE VEHICLE LONGITUDINAL DIRECTION

REAR SIDE WITH RESPECT
TO THE VEHICLE
LONGITUDINAL DIRECTION

SUSPENSION STRUCTURE

CROSS-REFERENCE TO RELATED PATENT APPLICATIONS

This application claims priority of Japanese Patent Application No. 2006-163803 filed on Jun. 13, 2006, and Japanese Patent Application No. 2006-163804, filed on Jun. 13, 2006, each of which is incorporated herein in its entirety by reference.

FIELD OF THE INVENTION

The invention pertains generally to a suspension structure having a shock absorber and stabilizer.

BACKGROUND

A conventional suspension structure, for example, is described in Japanese Kokai Patent Application No. 2000-153705. In this suspension structure, it is disclosed that when the wheel side end portion of the stabilizer is connected to a strut member, the connecting point between the rod member and the strut member and the connecting point between the rod member and the stabilizer are on an extension of the axial line of the shock absorber.

SUMMARY

Embodiments of a suspension structure and method are taught herein. One example of a suspension structure comprises a shock absorber for dampening the vibration from a wheel and a stabilizer for suppressing up and down strokes in opposite phases generated from opposing wheels. The end portion of the stabilizer is connected to a lower end portion of the shock absorber.

Another example of a suspension structure comprises means for dampening the vibration from a wheel and means for suppressing the up and down strokes in opposite phases generated from opposing wheels. The end portion of the means for suppressing is connected to the lower end on the means for dampening.

A method for operating a suspension structure is taught herein. One such method comprises dampening the vibration from a wheel with a shock absorber and suppressing the up and down strokes in opposite phases generated from opposing wheels with a stabilizer wherein an end portion of the stabilizer is connected to a lower end portion of the shock absorber.

BRIEF DESCRIPTION OF DRAWINGS

The description herein makes reference to the accompanying drawings wherein like reference numerals refer to like parts throughout the several views, and wherein.

DETAILED DESCRIPTION OF EMBODIMENTS OF THE INVENTION

In a conventional suspension structure as disclosed in Japanese Kokai Patent Application No. 2000-153705, a wheel side portion of the stabilizer is connected to a strut member and the connecting point between the rod member and the strut member and the connecting point between the rod member and the stabilizer are on an extension of the axial line of the shock absorber.

In the arrangement described, the stabilizer of the conventional suspension structure receives a force in the roll direction from the wheel while the shock absorber receives a force in the axial direction from the wheel. Receipt of these different forces can cause rocking of the shock absorber. In contrast, according to embodiments of the invention the lower end portion of the shock absorber and the wheel side end portion of the stabilizer are coaxial. Therefore, reactive force of the stabilizer acting as a bending moment on the shock absorber can be suppressed so that rocking of the shock absorber can also be suppressed.

In the following, an explanation is given regarding embodiments of the invention with reference to the figures.

Figure 1:
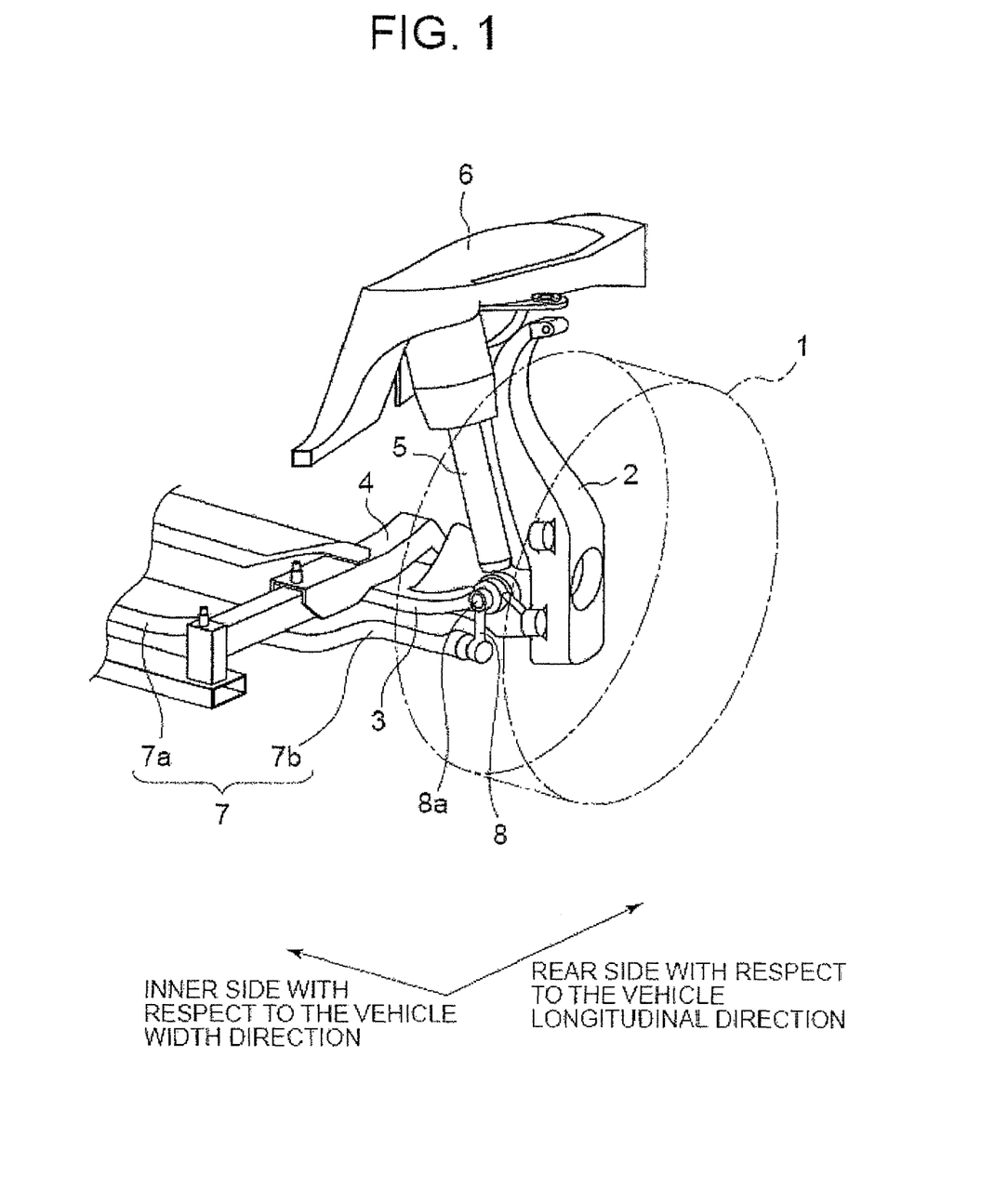
FIG. 1 is a perspective view illustrating the suspension structure in a first embodiment according to the invention.
Figure 2:
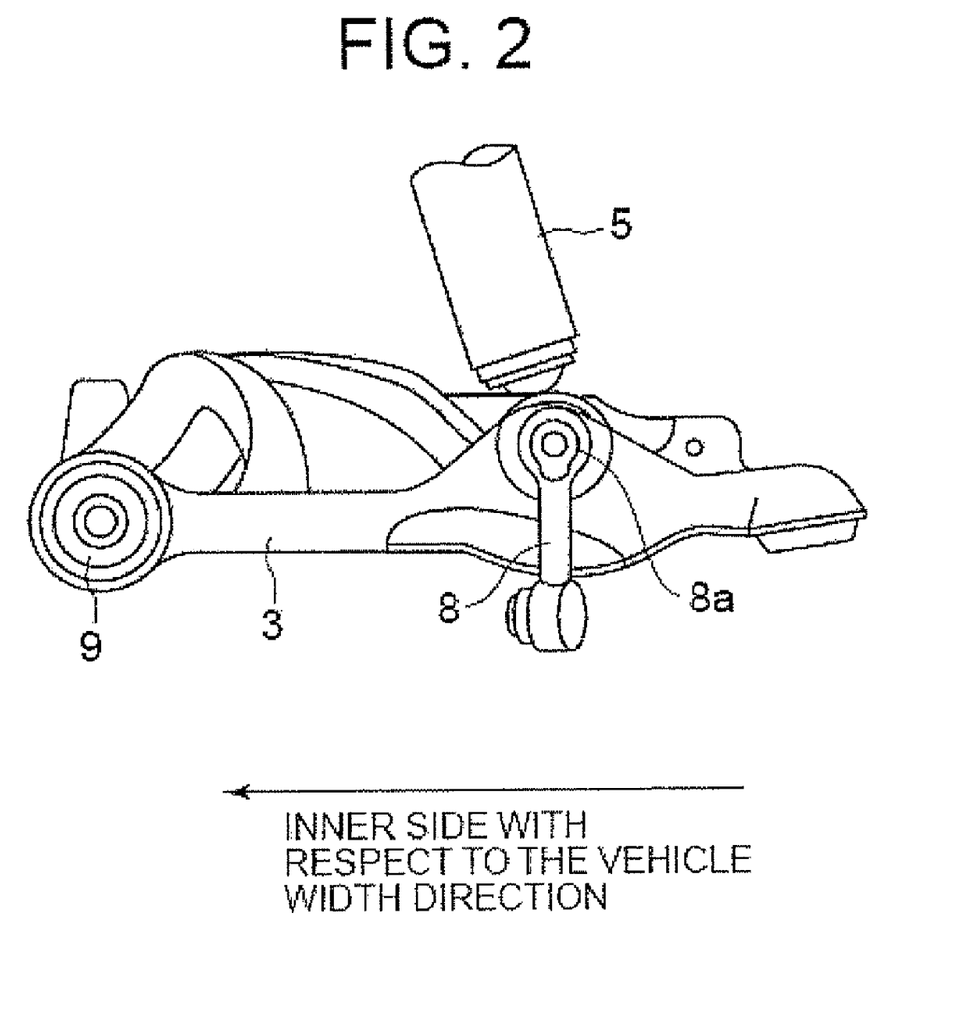
FIG. 2 is a front view illustrating an attachment on a suspension arm according to the first embodiment.

FIG. 1 is a perspective view illustrating the suspension structure of the first embodiment. FIG. 2 is a diagram illustrating the attachment portion of shock absorber 5 and the stabilizer as well as suspension link, or arm, 3 (the lower arm in the first embodiment) as seen from in front of the vehicle.

Each wheel 1 is supported in a free rotatable way on axle 2 (wheel supporting member). The outer end portion of suspension arm 3 is connected via a ball joint to the lower end portion of the axle 2. The suspension arm 3 has its inner end portion extending in the wheel width direction connected via bushing 9 to the suspension member 4 such that it can rock up/down. The lower end portion 5a of a shock absorber 5 is connected to the wheel side position of the suspension arm 3. In FIG. 1, reference number 6 represents an upper mount set on the upper portion of shock absorber 5.

Also, the wheel side end portion of stabilizer 7 is connected to suspension arm 3 at the position where it overlaps the lower end portion 5a of shock absorber 5 as seen from the longitudinal direction of the vehicle. Here, stabilizer 7 is composed of stabilizer main body 7a that extends in the wheel lateral direction, left/right arm parts 7b connected to the two end portions of the stabilizer main body 7a, and rod 8 that has one end portion connected to each of left/right arm parts 7b and has the other end portion 8a connected to suspension arm 3. The other end portion 8a of rod 8 forms the wheel side end portion of stabilizer 7. Here, the stabilizer main body 7a is elastically supported via brackets with respect to suspension member 4 at the left/right symmetric positions.

In the following, an explanation will be given regarding the structure of attachment of the lower end portion 5a of shock absorber 5 and stabilizer 7 on suspension arm 3.

Figure 3:
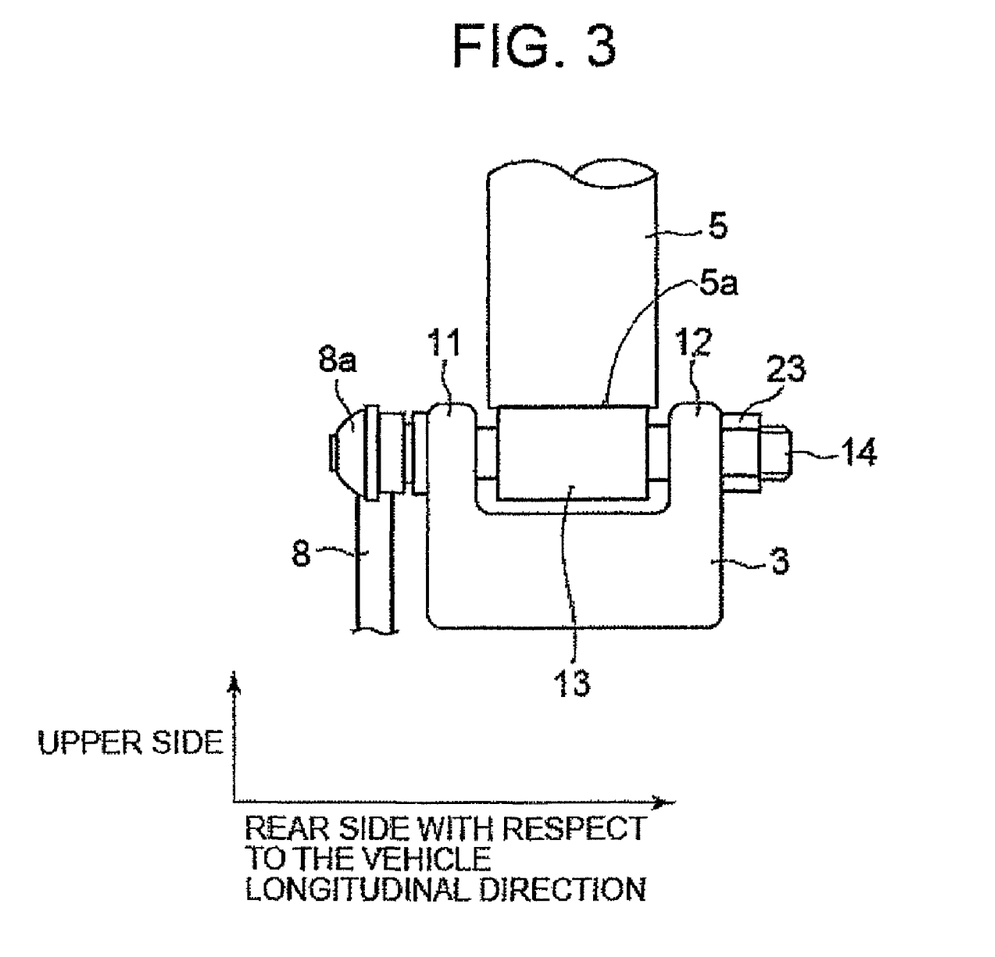
FIG. 3 is a schematic diagram of the attachment of the suspension pertaining to the first embodiment.

As shown in FIG. 3, two supporting plates 11, 12 protrude upward from suspension arm 3. The two supporting plates 11, 12 face each other in the longitudinal direction of the wheel, and spacing is present between supporting plates 11, 12 that allows insertion of the lower end portion 5a of shock absorber 5. Also, on the two supporting plates 11, 12, bolt inserting holes are formed concentrically therethrough.

On the lower end portion 5a of shock absorber 5, bushing 13 is set with its axis oriented in the longitudinal direction of the vehicle. This bushing 13 has a structure with an elastic member inserted between an inner cylinder and an outer cylinder, and the outer cylinder is fixed on shock absorber 5. Also, for bushing 13 the inner cylinder is longer than the outer cylinder, and the inner cylinder is fixed by bolt 14 while it is in contact with two supporting plates 11, 12. Also, on upper end portion 8a of rod 8 that forms the wheel side end portion of stabilizer 7, a through hole that allows insertion of bolt 14 is formed.

The bushing 13 is set between the two supporting plates 11, 12 such that it is coaxial with the bolt inserting holes on the supporting plates 11, 12. Together with the bushing 13, with respect to the surface on the front side of front-side supporting plate 11 in the longitudinal direction of the vehicle among the two supporting plates 11, 12, while the through hole of upper end portion 8a of the rod 8 is set, the shaft of bolt 14 is inserted from the side of rod 8 coaxially through the through hole formed on upper end portion 8a of rod 8, the inserting holes of two supporting plates 11, 12 and the inner cylinder of bushing 13. Nut 23 is fastened on the tip portion of the shaft of bolt 14 for securing the bushing 13. As a result, by means of a single bolt 14, the lower end portion 5a of shock absorber 5 and wheel side end portion 8a of stabilizer 7 are connected with respect to two supporting plates 11, 12 set on suspension arm 3 in this structure.

Next described are the operation and effect of the first embodiment. In conjunction with the up/down strokes of wheel 1, the shock absorber 5 generates a damping force. Here, by means of a torsional reactive force of stabilizer main body 7a, stabilizer 7 suppresses the up/down strokes in opposite phases generated in left/right wheels 1. In this case, in order to increase the torsional force of stabilizer 7 and to increase the efficiency of stabilizer 7, it is preferred that wheel side end portion 8a of stabilizer 7 be set as near the wheel 1 as possible.

In this embodiment, the attachment portion of the lower portion 5a of shock absorber 5 and the attachment portion of stabilizer 7 are set coaxial with respect to suspension arm 3. As a result, it is possible to set wheel side end portion 8a of stabilizer 7 nearer the wheel together with the lower portion 5a of shock absorber 5. As a result, it is possible to increase the efficiency of stabilizer 7 so that when turning, roll of the vehicle body can be reduced, and the comfort is improved.

Also, when a torsional reactive force is generated in the stabilizer 7, the reactive force is transferred to the attachment point of stabilizer 7 of suspension arm 3, and a supporting reactive force is generated at the attachment point. Since this supporting reactive force is supported via bolt 14 by two supporting plates 11, 12, transmission of an undesired rocking force to the lower end portion of shock absorber 5 is suppressed. That is, assuming a case where the supporting reactive force of stabilizer 7 acts on the lower end portion 5a of shock absorber 5 due to the up/down strokes of wheel 1, this force acts such that the shock absorber 5 is rotatingly displaced around the axis in the longitudinal direction of the shock absorber 5, and a torsional displacement is also input to the coil spring that is set around the shock absorber 5 and is mechanically connected to shock absorber 5, so that a load variation takes place. Due to this variation in the load, wheel 1 may vibrate in the turning direction.

On the other hand, even when the supporting reactive force of stabilizer 7 is input to bolt 14, since bolt 14 is supported by two supporting plates 11, 12 set on a suspension with high rigidity, the supporting rigidity is increased, and the rocking of shock absorber 5 does not take place. Also, bolt 14 is nearly integrated to suspension arm 3, and it only rocks up/down. In addition, suspension arm 3 that supports the bolt 14 has high attachment rigidity and a small displacement distance so that it is possible to suppress deterioration in the stabilizer function due to rocking of the attachment shaft of the wheel side end portion of stabilizer 7.

Also, together with the torsional reactive force of stabilizer 7, the damping force of shock absorber 5 also acts on bolt 14. However, by means of the twin holding structure of bolt 14 using two supporting plates 11, 12 where the two supporting plates 11, 12 are fixed parts, the rigidity can be lower, that is, two supporting plates 11, 12 can be smaller. This is favorable with respect to layout. Here, one may also adopt a scheme in which instead of supporting plates 11, 12, only one supporting plate is used, and bushing 13 of shock absorber 5 is set on one side surface of one supporting plate, while rod 8 of stabilizer 7 is set on the other side surface of the supporting plate, so that fixing is realized by only one bolt 14. Here, since bolt 14 has a cantilever structure, in order to guarantee the rigidity of a single supporting plate, the single supporting plate should be larger than when the two supporting plates 11, 12 are used.

In the following, an explanation is given regarding the second embodiment. Here, the same part numbers as those adopted in the first embodiment are used. The basic constitution of this embodiment is the same as that of the first embodiment. The second embodiment differs from the first embodiment in the structure of the two supporting plates 11, 12.

Figure 4:
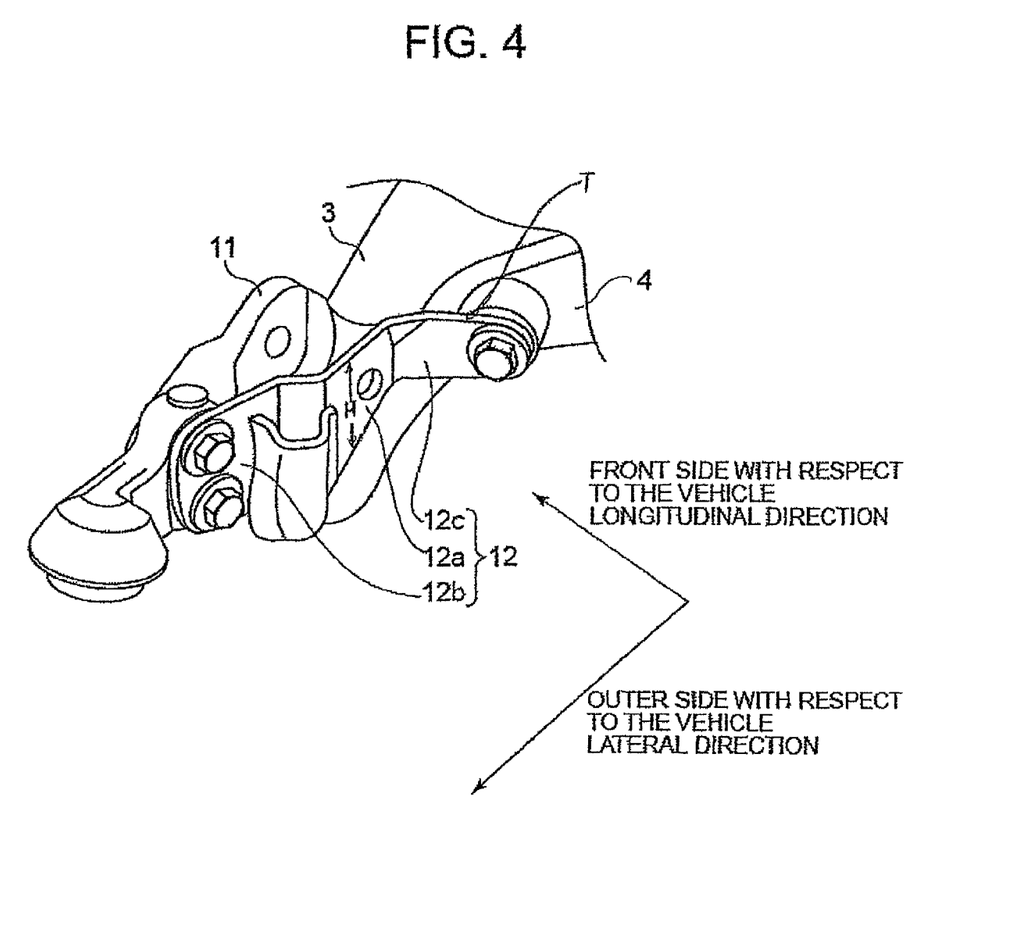
FIG. 4 is a perspective view of a supporting plate according to a second embodiment according to the invention.
Figure 5:
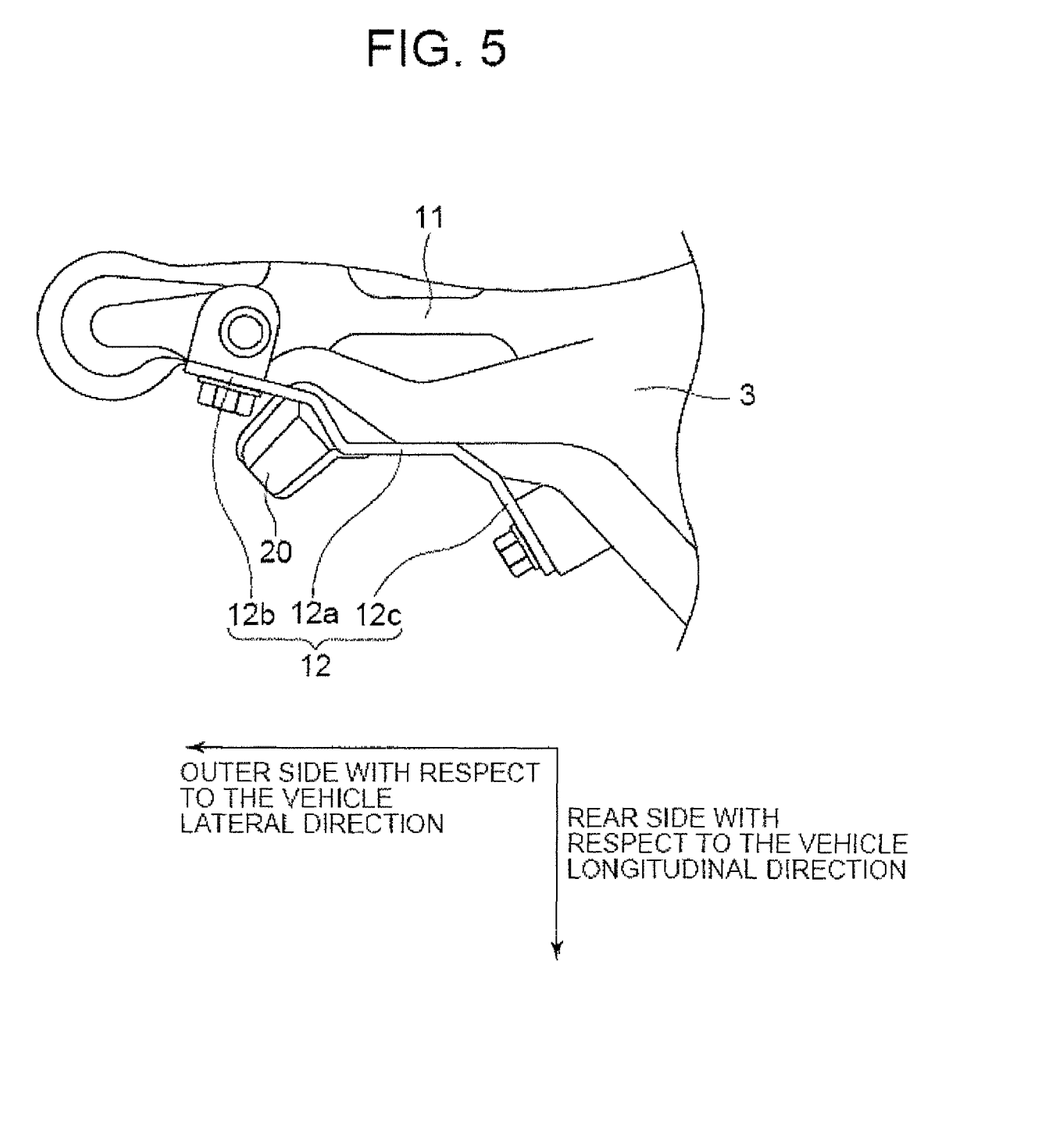
FIG. 5 is a plan view illustrating the supporting plate shown in FIG. 4.
Figure 6:
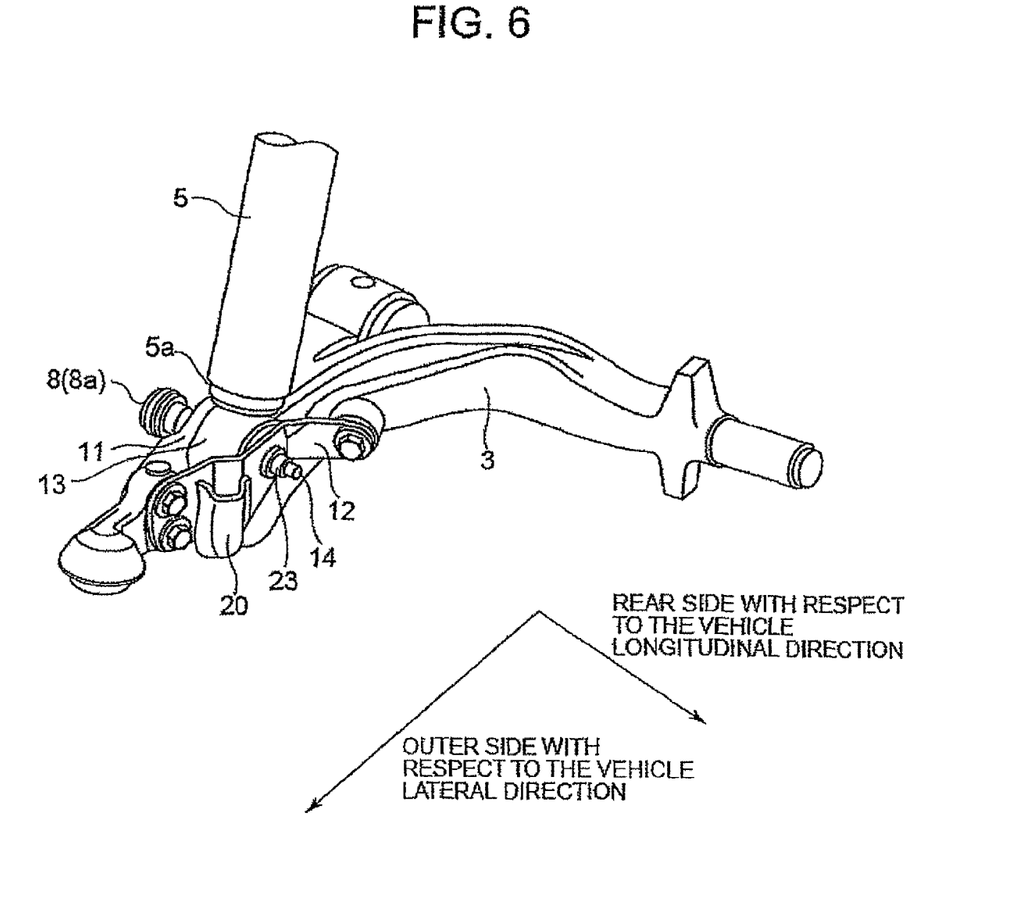
FIG. 6 is a perspective view attachment pertaining to the second embodiment.

As shown in FIGS. 4, 5 and 6 regarding the two supporting plates 11, 12, front-side supporting plate 11 (hereinafter to be referred to also as first supporting plate 11) with respect to the longitudinal direction of the vehicle is integrally formed with suspension arm 3 and rises from the suspension arm 3. The first supporting plate 11 has rod 8 of the stabilizer fixed thereon. On the other hand, the rear-side supporting plate 12 (hereinafter to be referred to also as second supporting plate 12) is made of a plate member separate from the suspension arm 3.

The second supporting plate 12 is composed of supporting plate main body 12a facing the first supporting plate 11, wheel side end portion 12b that is connected via an intermediate portion bent forward to the wheel side of supporting plate main body 12a and has two bolt holes formed on the upper/lower sides of the end portion, and member side end portion 12c that is connected to the side of suspension member 4 of supporting plate main body 12a, is bent obliquely to the rear side and has a bolt hole formed at the end position. Also, on the supporting plate main body 12a, a bolt inserting hole for inserting a bolt is formed.

As shown in FIGS. 4 and 5, two end portions 12b, 12c of second supporting plate 12 are fastened by bolts and are fixed on the side surface of suspension arm 3. As a result, second supporting plate 12 is supported on suspension arm 3 by means of a beam structure with two ends fixed. Here, the distance between supporting plate main body 12a of second supporting plate 12 and first supporting plate 11 facing each other is selected a little longer than the length of inner cylinder 13a (shown in FIG. 8) of bushing 13.

Figure 7:
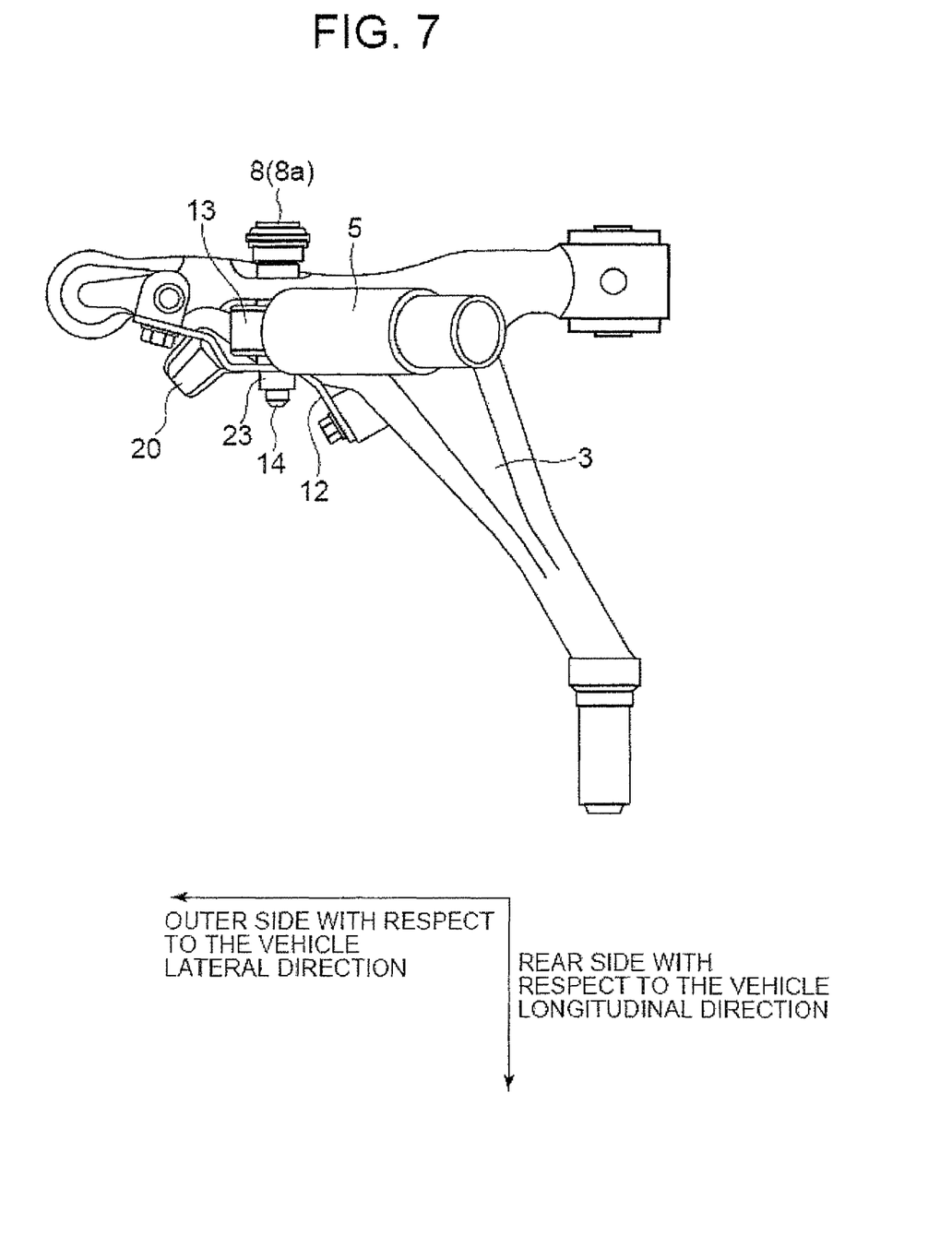
FIG. 7 is a plan view illustrating attachment pertaining to second embodiment.

As shown in FIGS. 6 and 7, between the first supporting plate 11 and second supporting plate 12, bushing 13 is set in the lower end portion 5a of shock absorber 5, and, together with it, the upper end portion of rod 8 of stabilizer 7 is set on the front side surface of first supporting plate 11. Just as in the first embodiment, the shaft of bolt 14 goes through the upper end portion of rod 8, two supporting plates 11, 12, and bushing 13 from the side of rod 8, and a nut 23 is fastened on the tip of the shaft of bolt 14 for securement. In this case, nut 23 is fastened until the two end portions of the inner cylinder of bushing 13 in the axial direction make contact with first supporting plate 11 and the second supporting plate 12, respectively.

When two supporting plates 11, 12 are formed monolithically with the suspension arm 3, depending on the type of the material of suspension arm 3, variation is possible to ensure both the static strength and the fastening force required when the shock absorber 5 is fastened. That is, for the fastening force, if the supporting plates do not develop a certain degree of deflection, the appropriate fastening force cannot be realized.

On the other hand, in this second embodiment, due to the twin supporting beam structure with both end portions 12b, 12c of the second supporting plate 12 in the wheel width direction being secured, it is possible to guarantee a desired fastening force independent of the material of suspension arm 3. This is due to the fact that deflection takes place for the second supporting plate 12 and a prescribed springiness is displayed. Also, since the first supporting plate 11 near rod 8 is formed monolithically with suspension arm 3, the structure is favorable with respect to the supporting rigidity of rod 8.

Here, the force in the up/down direction from the stabilizer 7 and the shock absorber 5, especially that from shock absorber 5, is input to the bolt 14 and is received by two supporting plates 11, 12. In consideration of this fact, for the second supporting plate 12, it is preferred that the height (H) in the up/down direction be larger as compared to the thickness (T) of the plate in the axial direction of bolt 14. By having a larger height (H) in the up/down direction, the geometrical moment of inertia with respect to input in the up/down direction works to ensure static strength in the up/down direction. Also, by having a smaller width (T) in the vehicle horizontal direction (thickness direction), it is possible to generate deflection for the fastening force.

In order to reduce the weight of suspension arm 3, the suspension arm 3 and first supporting plate 11 can be formed monolithically and be made of aluminum. In this case, it is preferred that second supporting plate 12 be made of iron. Since iron has higher elasticity than aluminum, it is possible to reduce the weight of suspension arm 3 while the desired fastening force can be displayed as springiness due to deflection of second supporting plate 12.

As shown in FIG. 7, reference number 20 represents a knuckle stop member. By setting the knuckle stop on second supporting plate 12, it is possible for the attachment portion on suspension arm 3 to be shaped by second supporting plate 12 and knuckle stop member 20, so that the number of parts can be reduced. Of course, one may also adopt a scheme in which knuckle stop member 20 is fixed on second supporting plate 12.

Figure 8:
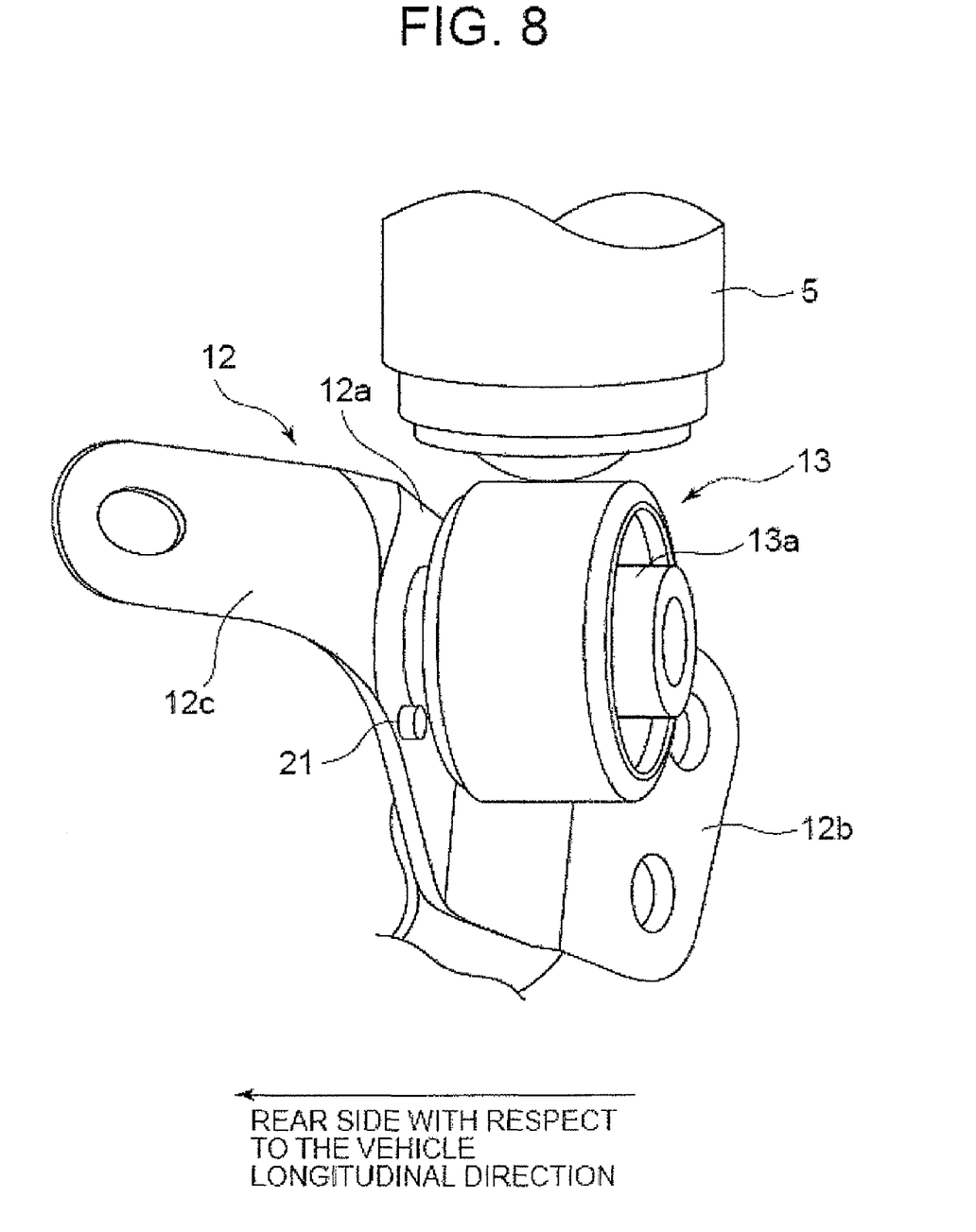
FIG. 8 is a diagram illustrating the position of a protrusion pertaining to the second embodiment.

Also, as shown in FIG. 8, the following scheme may be adopted: one or several protrusions 21 are formed on the side surface of second supporting plate 12 facing bushing 13 to make contact with the outer peripheral surface of inner cylinder 13a of bushing 13, especially the outer peripheral surface of the inner cylinder 13a lower than the height of the axis of bushing 13, Also, protrusions 21 may be formed on supporting plate 11. In this way, by forming protrusions 21, when the lower end portion of shock absorber 5 is inserted between two supporting plates 11, 12, the end portion outer peripheral surface of inner cylinder 13a of bushing 13 makes contact with the bolt 14 so that the lower end portion 5a of shock absorber 5 is positioned. As a result, the fastening operation can be facilitated.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A suspension structure, comprising:
   a shock absorber for dampening the vibration from a wheel;
   a stabilizer for suppressing the up/down strokes in opposite phases generated from the opposing wheels, wherein an end portion of the stabilizer is connected to a lower end portion of the shock absorber; and
   a suspension arm disposed between a suspension member and an axle supporting the wheel in a free rotating manner, wherein the lower end portion of the shock absorber and the stabilizer are attached on the suspension arm.

2. The suspension structure according to claim 1 wherein the lower end portion of the shock absorber and the stabilizer are connected using a same bolt.

3. The suspension structure according to claim 2, further comprising:
   a supporting plate set on the suspension arm, wherein the lower end portion of the shock absorber and a wheel side end portion of the stabilizer are fastened by the same bolt disposed through the supporting plate.

4. The suspension structure according to claim 1, further comprising:
   at least two supporting plates, two of the at least two supporting plates facing each other on the suspension arm, wherein lower end portions of the two supporting plates and the shock absorber are fixed by a same bolt, and a wheel side end portion of the stabilizer is connected to the same bolt.

5. The suspension structure according to claim 4 wherein the two supporting plates further comprise:
   a first supporting plate formed monolithically with the suspension arm and a second supporting plate formed as a separate part with respect to the suspension arm and having two end portions fixed on the suspension arm, wherein the spacing between the first supporting plate and the second supporting plate with the lower end portion of the shock absorber held therebetween is larger than the width of the lower end portion of the shock absorber.

6. The suspension structure according to claim 5 wherein the width of the second supporting plate in the direction facing the first supporting plate is smaller than the length in the vertical direction of the second supporting plate.

7. The suspension structure according to claim 5 wherein the wheel side end portion of the stabilizer is connected to the surface of the first supporting plate opposite the surface facing the lower end portion of the shock absorber.

8. The suspension structure according to claim 5 wherein the second supporting plate has an elastic force larger than an elastic force of the suspension arm and the first supporting plate.

9. The suspension structure according to claim 8 wherein the suspension arm and the first supporting plate are made of at least one of aluminum and an aluminum alloy.

10. The suspension structure according to claim 5, further comprising:
    a knuckle stop set on the second supporting plate.

11. The suspension structure according to claim 5, further comprising:
a protruding member defining the position of the lower end of the shock absorber, the protruding member formed on the surface of the second supporting plate facing the lower end portion of the shock absorber.

12. A suspension structure, comprising:
means for damping the vibration from a wheel; and
means for suppressing the up/down strokes in opposite phases generated by opposing wheels;
wherein a suspension arm is connected to a suspension member;
wherein a lower end portion of the damping means and the suppressing means are attached onto the suspension arm using a bolt; and
wherein an end portion of the suppressing means is connected on the lower end portion of the damping means.

13. A method of operating a suspension structure, comprising:
damping the vibration from a wheel with a shock absorber;
suppressing the up/down strokes in opposite phases generated from opposing wheels with a stabilizer, wherein an end portion of the stabilizer is connected to a lower end portion of the shock absorber;
connecting a suspension arm to a suspension member;
setting at least one supporting plate on the suspension arm; and
fixing a wheel side end portion of the stabilizer and the shock absorber to the at least one supporting plate.

14. The method according to claim 13, wherein fixing the wheel side end portion of the stabilizer and the shock absorber to the at least one supporting plate comprises:
fastening the lower end portion of the shock absorber and the wheel side end portion of the stabilizer with a bolt disposed through the supporting plate.

15. The method according to claim 13, wherein the at least one supporting plates includes two supporting plates facing each other on the suspension arm and wherein fixing the wheel side end portion of the stabilizer and the shock absorber to the at least one supporting plate comprises:
fixing the lower end portions of the two supporting plates and the shock absorber by a bolt; and
connecting the wheel side end portion of the stabilizer to the bolt.

16. The method according to claim 15 wherein the two supporting plates include a first supporting plate formed monolithically with the suspension arm and a second supporting plate formed as a separate part with respect to the suspension arm, the method further comprising:
fixing two end portions of the second supporting plate onto the suspension arm; and
spacing the first supporting plate and the second supporting plate with the lower end portion of the shock absorber therebetween larger than a width of the lower end portion of the shock absorber.

17. The method according to claim 16, comprising:
connecting a wheel side end portion of the stabilizer to a surface of the first supporting plate opposite a surface facing the lower end portion of the shock absorber wherein a width of the second supporting plate in the direction facing the first supporting plate is smaller than a length of the second supporting plate.

18. The method according to claim 17 wherein a protruding member is formed on the surface of the second supporting plate facing the lower end portion of the shock absorber, and the protruding member defines the position of attachment of the lower end portion of the shock absorber.

* * * * *